United States Patent

Sullivan et al.

[15] 3,648,067

[45] Mar. 7, 1972

[54] GATED VARIABLE POLARITY REVERSING RAMP GENERATOR

[72] Inventors: Wayne A. Sullivan; Donald A. Scolaro, both of Fort Lauderdale, Fla.

[73] Assignee: The Bendix Corporation

[22] Filed: July 30, 1970

[21] Appl. No.: 62,221

[52] U.S. Cl. ..............................307/228, 307/246, 307/273, 328/128, 328/181, 328/185

[51] Int. Cl. ..........................................................H03k 4/08

[58] Field of Search ..................307/228, 246, 273; 328/127, 328/128, 151, 181, 185, 207

[56] References Cited

UNITED STATES PATENTS

| | | | |
|---|---|---|---|
| 3,034,061 | 5/1962 | Bargeski | 328/181 X |
| 3,277,395 | 10/1966 | Grindle et al. | 307/228 X |
| 3,113,219 | 12/1963 | Gilmore | 307/273 X |
| 2,945,966 | 7/1960 | Davenport | 307/273 |
| 3,278,737 | 10/1966 | Germain | 307/228 X |
| 3,448,255 | 6/1969 | Murphy | 328/127 X |
| 3,350,574 | 10/1967 | James | 307/246 X |
| 3,482,116 | 12/1969 | James | 307/228 X |
| 3,505,614 | 4/1970 | Marthe | 307/246 X |

*Primary Examiner*—Donald D. Forrer
*Assistant Examiner*—R. C. Woodbridge
*Attorney*—Plante, Hartz, Smith and Thompson, Bruce L. Lamb and William G. Christoforo

[57] ABSTRACT

A gated, variable polarity, reversing ramp generator circuit wherein a positive and negative sweep such as used in a cathode-ray tube display of aircraft navigational data is controlled by positive and negative input voltage excursions about zero. A feature of the circuit is that there are no discontinuities about zero from either positive or negative input voltage levels.

1 Claims, 2 Drawing Figures

INVENTORS
WAYNE A. SULLIVAN
DONALD A. SCOLARO
BY
ATTORNEY

INVENTORS
WAYNE A. SULLIVAN
DONALD A. SCOLARO
BY [signature]
ATTORNEY

GATED VARIABLE POLARITY REVERSING RAMP GENERATOR

BACKGROUND OF THE INVENTION

1. Field of the Invention

This invention relates to ramp voltage generators and, more particularly, to gated, variable polarity, reversing ramp voltage generators.

2. Description of the Prior Art

Heretofore, there has not been a ramp generator incorporating the variable polarity, reversing and gating features of the present invention. Moreover, the device does not suffer from discontinuities about zero during input voltage excursions from positive or negative levels and is thus particularly useful in aircraft navigational equipment. Since the device is constructed from solid-state components, it is accurate and reliable and consumes minimum space and weight.

SUMMARY OF THE INVENTION

This invention contemplates a gated, variable polarity, reversing ramp generator including an integrator responsive to a DC input signal for providing a reversed polarity ramp output, with the rate at which the ramp output approaches the input signal level being determined by a resistor and capacitor in the integrator circuit. Gating is provided by an oscillator circuit generating an output for controlling a switch which periodically shorts out the integrator capacitor to determine the duration of the ramp. The duration of the gate is controlled by a resistor in the oscillator circuit.

One object of this invention is to provide a gated, variable polarity, reversing ramp generator which is more accurate and reliable and consumes less space and weight than devices of the type heretofore known in the art.

Another object of this invention is to provide a ramp generator of the type described, wherein discontinuities about zero due to input signal excursions from either positive or negative levels are eliminated.

Another object of this invention is to provide a ramp generator of the type described and including an integrator circuit responsive to a variable level DC input signal for providing a variable ramp output and an oscillator circuit for driving a switch to gate the ramp output.

Another object of this invention is to include a variable resistor in the oscillator circuit for controlling the duration of the gate.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
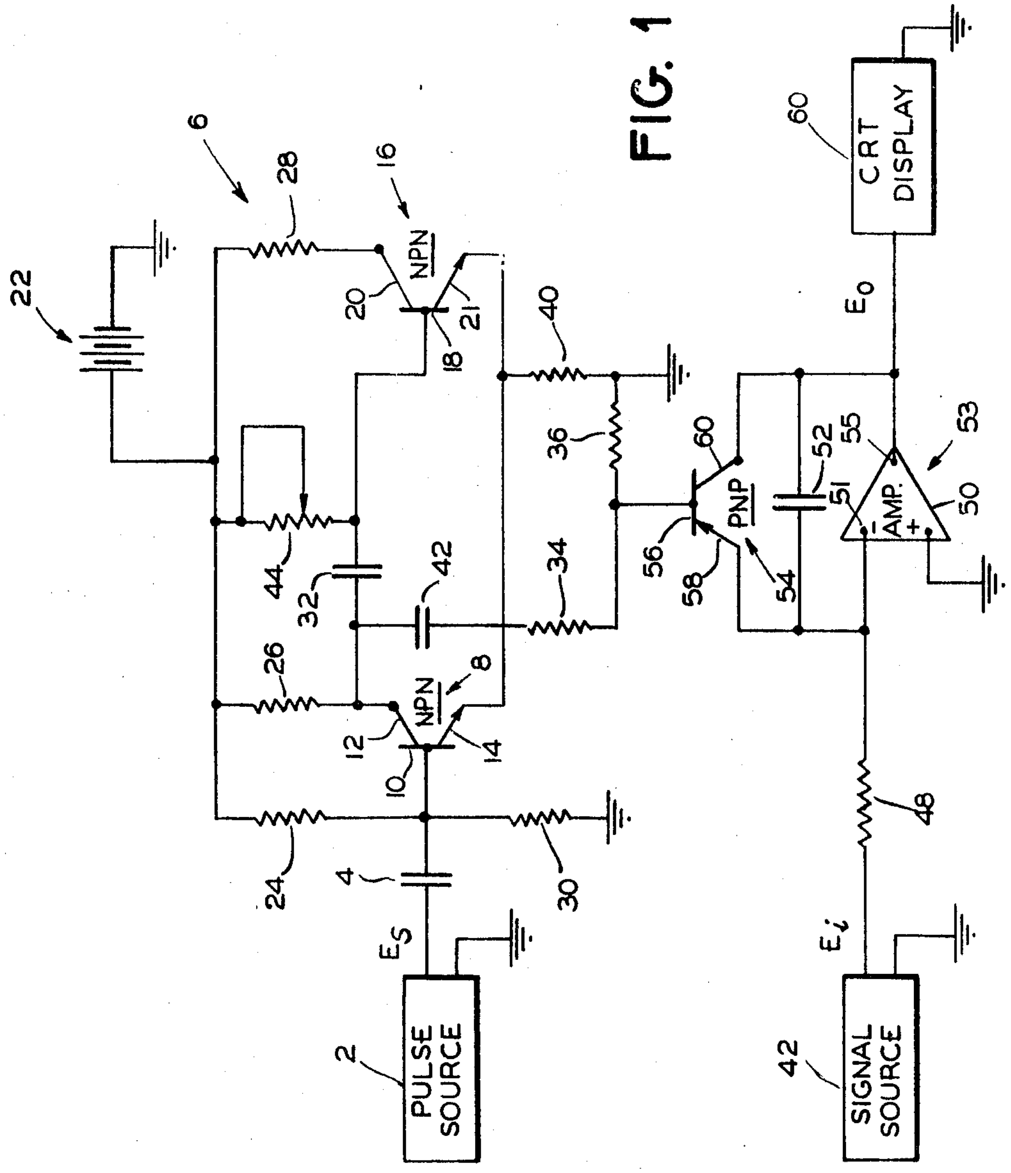
FIG. 1 is an electrical schematic diagram of a ramp generator constructed according to the invention.

FIG. 1 shows a pulse source 2 which may be a conventional-type oscillator circuit for providing a starting pulse $E_S$. Starting pulse $E_S$ is applied through a blocking capacitor 4 to a monostable multivibrator designated generally by the numeral 6. Multivibrator 6 is of the type including a NPN-transistor 8 having base, collector and emitter elements 10, 12 and 14, respectively, and a NPN-transistor 16 having base, collector and emitter elements 18, 20 and 21, respectively.

One of the transistors 8 and 16 of monostable multivibrator 6 is conductive and the other transistor is nonconductive until the multivibrator is triggered by pulse $E_S$ from pulse source 2. Once triggered, the multivibrator switches states, with the previously conductive transistor becoming nonconductive and the nonconductive transistor becoming conductive. After an interval determined by circuit parameters, multivibrator 6 reverts to its original state. Once back in its original state no further switching occurs until the multivibrator is again triggered by pulse $E_S$. For this reason, multivibrator 6 is commonly known in the art and will be hereinafter referred to as a "one-shot" multivibrator. The operation of a multivibrator of this type is described in detail at page 440, *Electronics for Scientists*, Malmstadt, et al., W. A. Benjamin, Inc. New York, 1963.

In accordance with the above, a suitable source of DC biasing voltage shown as a battery 22 is connected through a resistor 24 to base 10 of transistor 8 and through a resistor 26 to collector 12 of the transistor. Base 10 of transistor 8 is connected to ground through a resistor 30. Battery 22 is connected through a resistor 28 to collector 20 of transistor 16.

Collector 12 of transistor 8 is connected through a capacitor 32 to base 18 of transistor 16. Emitter 14 of transistor 8 and emitter 21 of transistor 16 are connected to ground through a resistor 40.

A capacitor 42 is connected to collector 12 of transistor 8 and is connected to ground through serially connected resistors 34 and 36. A variable resistor 44 is connected in parallel with resistor 26 and intermediate capacitor 32 and base 18 of transistor 16.

A signal source 42 provides a positive or negative variable DC signal $E_i$, and which signal $E_i$ may be, for purposes of illustration, a flight condition error signal such as used for controlling an aircraft. Signal source 42 is connected through a resistor 48 to an inverting input terminal 51 of an operational amplifier 50 having a capacitor 52 connected in feedback relation to amplifier input terminal 51 and to an amplifier output terminal 55 for providing an integrator designated generally by the numeral 53. Integrator 53 may be, for purposes of illustration, a device of the type described at pages 356–358, *Electronics for Scientists*, supra, and provides a ramp output $E_O$ at output terminal 55 for driving, for example, a cathode-ray tube display 60 which displays aircraft navigational data.

The relation between input signal $E_i$ and output signal $E_O$ is in accordance with the following equation:

$$E_0 = -\frac{1}{RC}\int_0^t E_i dt$$

Integrator 53 is connected to multivibrator 6 through a PNP-transistor 54. Transistor 54 includes a base 56 connected intermediate resistors 34 and 36, an emitter 58 connected to input terminal 51 of amplifier 53 and a collector 60 connected to output terminal 55 of the amplifier. Transistor 54 is rendered alternately conductive and nonconductive by the output of one-shot multivibrator 6 at collector 12 of transistor 8 thereof, and which output is provided in accordance with the aforegoing explanation.

OPERATION

Integrator 53 integrates signal $E_i$ from signal source 42 to provide ramp output $E_O$. The values of resistor 48 and capacitor 52 determine the rate at which ramp output $E_O$ approaches input signal $E_i$.

Figure 2:
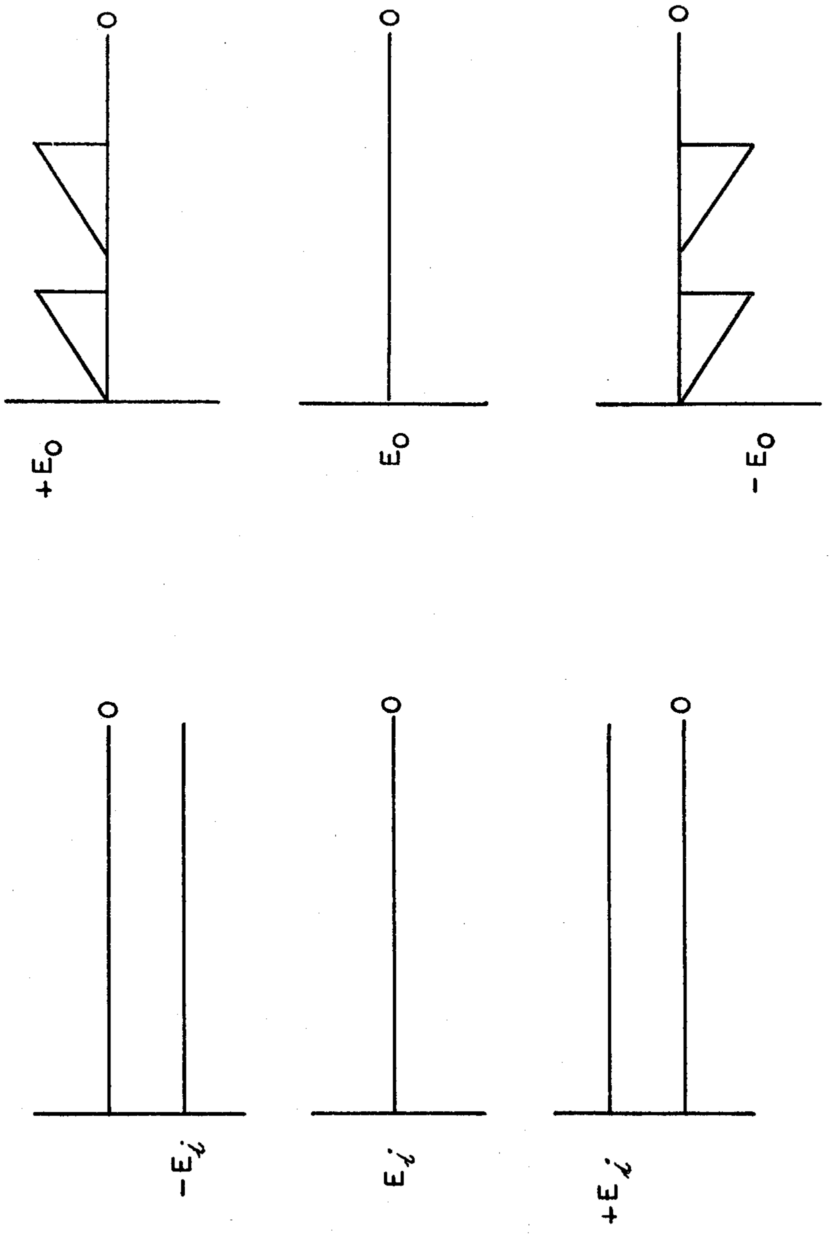
FIG. 2 is a graphical representation showing wave forms of DC input signals and corresponding ramp output signals provided in accordance with the invention.

The structural arrangement is such that when input signal $E_i$ is at some negative level, ramp output $E_O$ is positive. When input signal $E_i$ is zero, ramp output $E_O$ is zero and when input signal $E_i$ is at some positive level ramp output $E_O$ is negative. The aforenoted relationships are shown in FIG. 2.

The gating effect is provided by the output of one-shot multivibrator 6 at collector element 12 thereof, and which output is applied through capacitor 42 and a voltage divider including resistors 34 and 36 to transistor 54. When transistor 54 is rendered alternately conductive and nonconductive by the oscillatory action of one-shot multivibrator 6 heretofore described, a gating action is effected. This gating action periodically shorts integrator capacitor 52 independent of the polarity of input signal $E_i$ and in effect determines the duration of ramp output $E_0$. The length of the gate, in turn, is controlled by the setting of variable resistor 44 in one-shot multivibrator 6.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A ramp generator system, comprising:

a pulse source for providing a starting pulse;

an oscillator connected to the pulse source and responsive to the starting pulse for providing an oscillating output;

a signal source for providing an input signal;

a resistor;

an integrator including an operational amplifier and a capacitor connected in feedback relation to the amplifier, the integrator connected through the resistor to the signal source, and responsive to the input signal for providing a ramp output, the rate at which the ramp output approaches the level of the input signal being determined by the value of the resistor and capacitor a second capacitor connected to the output of the oscillator;

a gate connected to the integrator; and, a voltage divider connecting the second capacitor to the gate.

* * * * *